April 11, 1961     M. A. WEINBERG     2,979,423
ISOCYANATE MODIFIED VINYL CHLORIDE COPOLYMER FILM
BACKED ADHESIVE TAPE
Filed Sept. 25, 1957

Fig. 1

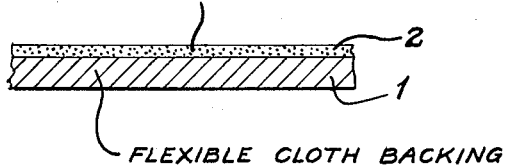

CHLORINATED HYDROCARBON SOLVENT RESISTANT VINYL CHLORIDE COPOLYMER ADHESIVE — 2

FLEXIBLE CLOTH BACKING — 1

Fig. 2

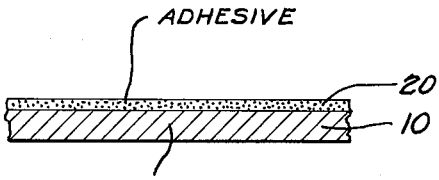

ADHESIVE — 20

CHLORINATED HYDROCARBON SOLVENT RESISTANT VINYL CHLORIDE COPOLYMER FILM BACKING — 10

Fig. 3

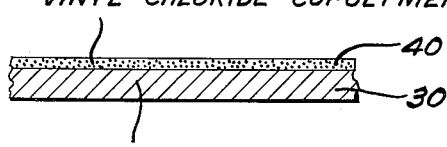

CHLORINATED HYDROCARBON SOLVENT RESISTANT VINYL CHLORIDE COPOLYMER ADHESIVE — 40

CHLORINATED HYDROCARBON SOLVENT RESISTANT VINYL CHLORIDE COPOLYMER FILM BACKING — 30

INVENTOR.
MARVIN A. WEINBERG
BY
Morgan, Finnegan, Durham & Pine

ATTORNEY

United States Patent Office 2,979,423
Patented Apr. 11, 1961

2,979,423

ISOCYANATE MODIFIED VINYL CHLORIDE CO-POLYMER FILM BACKED ADHESIVE TAPE

Marvin A. Weinberg, Metuchen, N.J., assignor, by mesne assignments, to Johnson & Johnson, New Brunswick, N.J., a corporation of New Jersey Filed Sept. 25, 1957, Ser. No. 686,146

4 Claims. (Cl. 117—122)

This invention relates to novel adhesive sheets and particularly to novel adhesive sheets wherein the backing and/or the adhesive thereof includes a vinyl chloride copolymer and a suitable compatible plasticizer.

The use of vinyl chloride polymers and copolymers with suitable plasticizers in adhesive sheets is well known. For example, many of the adhesive compositions employed in heat sealing mending sheets or tapes include a vinyl chloride polymer or copolymer and a suitable plasticizer.

Among the frequently used backings for adhesive sheets to be used in mending and patching are cotton cloth, preferably woven tighter than fifty square, coated cloth, impregnated cloth. For other applications the backing may be non-fibrous films, metal foils (for instance, aluminum foil), paper and coated or impregnated paper. The adhesives used for mending purposes should be resistant to washings and solvents used in dry cleaning. Unfortunately, however, current adhesive compositions used in mending tapes all have the shortcomings of being stiffened by chlorinated hydrocarbon dry cleaning solvents. This stiffening is caused by the extraction of plasticizer from the adhesive. It is obvious that stiffening of the adhesive coating is undesirable for it reduces greatly the flexibility of the adhesive tape.

Vinyl chloride polymer and copolymers in combination with suitable compatible plasticizers, in the form of films, are well known as structural and decorative surfacing materials. Such films, however, when in contact with chlorinated hydrocarbon solvents become stiff. As in the case with heat sealing adhesives, this stiffening is caused by the extraction of plasticizers from the vinyl chloride polymer or copolymers.

Accordingly, it is an object of this invention to provide novel vinyl chloride copolymer compositions containing a plasticizer wherein the plasticizer is resistant to extraction by chlorinated hydrocarbon solvents. More particularly, it is an object of this invention to provide novel adhesive sheets wherein the backing and/or adhesive includes a vinyl chloride copolymer in which the plasticizer is resistant to extraction by commercial chlorinated solvents. A still further object of this invention is to provide novel adhesive sheets wherein the backing and/or adhesive includes a vinyl chloride copolymer and plasticizer and in which said backing and/or adhesive exhibits resistance to stiffening when in contact with commercial chlorinated solvents. A still further object of this invention is to provide a novel method for the manufacture of adhesive sheets having the characteristics set forth above.

It has been found that the above objects may be realized by forming a curable composition which is not affected by chlorinated dry cleaning solvent, and which comprises a vinyl chloride copolymer containing at least one reactive group and a plasticizer having at least one reactive group and a polyisocyanate. With respect to the foregoing description of the vinyl chloride copolymer and plasticizer, the term "reactive group" means a group which will react with an isocyanate group of the polyisocyanate. It has been found that when such composition is cured the isocyanate reacts with both the vinyl chloride copolymer and the plasticizer thus effecting a chemical linkage therebetween which serves to strongly bond the vinyl chloride copolymer and plasticizer preventing extraction from the vinyl chloride component by commercial chlorinated solvents.

The type and amount of vinyl chloride component used will depend upon how the chlorinated solvent resistant composition is to be used, i.e., as a component of an adhesive or a film backing. In general, the vinyl chloride copolymer is in an amount from about 10% to about 70% by weight, and preferably 30–55%, of the total composition.

As indicated heretofore, the vinyl chloride copolymer must have at least a group which will react on an isocyanate group of the polyisocyanate. Examples of suitable vinyl chloride copolymers which may be used in accordance with this invention are the hydroxy modified vinyl chloride copolymers, such, for example, as vinyl chloride/vinyl alcohol/vinyl acetate 91/6/3 copolymer having an intrinsic viscosity of 0.57. This copolymer is described in U.S. Patent 2,512,726. It is manufactured by Bakelite Company, a division of Union Carbide Corporation, and sold under the trade name "Vinylite VAGH."

The amount of compatible hydroxy containing plasticizer that is used will vary depending upon how the final composition is to be used. In general, the plasticizer is in an amount from about 35 to 90% and preferably 45–70% by weight of the total composition.

Examples of suitable plasticizers are the saturated polyesters formed from a glycol and a dibasic carboxylic acid such, for example, as polypropylene glycol sebacate with an average molecular weight of 8,000 and hydroxyl number of 14 manufactured by Rohm & Haas and sold under the trade name "Paraplex G-25" and an oil modified sebacic alkyd with hydroxy groups sold under the trade name "Paraplex RG-8," castor oil and its derivatives such as D B Castor Oil (Baker Castor Oil Company), and a monohydroxy castor oil in which the other two hydroxyls have been blocked by esterification having a molecular weight of approximately 1000 manufactured by Baker Castor Oil Co. and sold under the trade name "Platicizer FO7525053," glycol esters such as glycerol diacetate; and polyethylene glycols, polypropylene glycols and their derivatives such as polypropylene glycol 1025 (Carbide)—average molecular weight 1000, polyglycol E 300 (Dow Chemical)—polyethylene glycol average molecular weight 300, methoxy polyethylene glycol 350 (Carbide)—average molecular weight 350, and Pycal 94 (Atlas Powder)—phenyl ether of polyethylene glycol.

In general, the polyisocyanate is in an amout from 0.1–30% by weight and preferably 3–15% by weight. Examples of suitable polyisocyanates which may be used are triphenylmethane triisocyanate, bitolylene dissocyanate, dianisidine diisocyanate, hexamethylene diisocyanate, diphenylmethane diisocyanate (MDI), 2,4 tolylene diisocyanate (TDI), toluene 2,4 diisocyanate dimer (TDI dimer), and a triisocyanate reaction product of 3 mols of TDI and 1 mol of hexanetriol manufactured by the Moboy Chemical Company and sold under the trade name "Mondur C."

EXAMPLE I

The following recipe A illustrates a chlorinated solvent resistant composition formed in accordance with the present invention dissolved in a suitable solvent (ethyl acetate).

Recipe A

| Ingredient: | Parts by weight |
| --- | --- |
| Vinylite VAGH | 60 |
| Paraplex-G-25 | 40 |
| MDI | 5 |
| Epoxy stabilizer A-5 (Carbide) polyepoxide (2 mols of epichlorhydrin per mol of diphenylol propane) | 1 |
| Ethyl acetate | 240 |

The above composition may be coated on cloth or cast as a free film and dried. The resulting film is then baked for 60 minutes at 100° C. When tested for resistance to extraction by dry cleaning solvents by immersing for 30 minutes in perchlorethylene and then drying, no stiffening of the vinyl composition was noted.

EXAMPLE II

The following recipes B, C and D illustrate another solvent resistant composition formed in accordance with the present invention and which may be coated on cloth or cast as a free film in the same manner as Example I.

Recipe B

| | Parts by weight |
| --- | --- |
| Vinylite VAGH | 40 |
| Plasticizer FO752053 | 60 |
| TDI | 13 |
| Stabilizer A-5 | 1 |
| Ethyl acetate | 160 |

Recipe C

| | Parts by weight |
| --- | --- |
| Vinylite VAGH | 45 |
| Paraplex G-25 | 55 |
| Mondur C | 15 |
| Stabilizer A-5 | 1 |
| Ethyl acetate | 180 |

Recipe D

| | Parts by weight |
| --- | --- |
| Vinylite VAGH | 15 |
| Paraplex G-25 | 85 |
| MDI | 5 |
| Stabilizer A-5 | 1 |
| Ethyl acetate | 100 |

EXAMPLE III

The following recipe E illustrates a chlorinated solvent resistant composition formed in accordance with this invention wherein a film or coating can be produced without the use of solvents:

Recipe E

| | Parts by weight |
| --- | --- |
| Vinylite VAGH | 50 |
| Paraplex G-25 | 50 |
| TDI dimer | 10 |
| Mark XI (coprecipitated barium-cadmium laurate—Argus Chemical Corp.) | 1 |

In the above composition, Vinylite VAGH, Paraplex G-25 and Mark XI are banburyed together at a temperature of 240° F. When the banbury mixture has cooled, the TDI dimer is dispersed in it on a cold two-roll mill. The completed composition can be calendered to a free film or as a cloth coating. This is converted to a non-extractable state by baking for 5 minutes at 160° C. at which temperature the dimer is converted to TDI.

It should be realized that all of the vinyl chloride compositions disclosed in Examples 1-3 on baking become converted to a non-thermoplastic, insoluble state and hence are useful as film backings or barrier coatings of tapes but not as heat activatable adhesives. The following example illustrates a permanently thermoplastic and soluble formulation useful as a mass that is not stiffened by perchlorethylene.

EXAMPLE IV

Recipe F

| | Parts by weight |
| --- | --- |
| Vinylite VAGH | 50 |
| Paraplex RG-8 | 50 |
| MDI | 5 |
| Stabilizer A-5 | 1 |
| Ethyl acetate | 200 |

In the above composition, Paraplex RG-8 was reacted with the MDI in a resin kettle for 1 hour at 150° C. A product was formed that was insoluble in perchlorethylene but still soluble in ethyl acetate. The use of more diisocyanate would have formed an ethyl acetate insoluble product. The reaction product was then dissolved in ethyl acetate together with VAGH.

EXAMPLE V

The following example illustrates a cloth mending tape formed in accordance with this invention utilizing the vinyl adhesive composition of Example IV.

The adhesive composition of Example IV is applied to one side of an 80/80 print cloth at a mass weight of 3 oz./sq. yd. The applied mass is oven dried at 140–220° F.

EXAMPLE VI

The following example illustrates the formation of a double face thermoplastic tape utilizing the adhesive composition of Example IV. 32/28 tobacco cloth is dip-coated in the adhesive mass of Example IV. Excess is removed with scraper blades to deposit total mass weight of 6.0 oz./sq. yd. The resulting coated cloth is dried in a tower coated at 140–220° F.

EXAMPLE VII

The following example illustrates the use of vinyl composition (Example II, recipe D) as a barrier coat and a second vinyl composition of this invention (Example IV) as the adhesive mass in forming a tape.

The composition recipe D of Example II is first coated on 80/80 print cloth to deposit a non-thermoplastic barrier coat with a weight of 1.0 oz./sq. yd. The coated cloth is oven dried at 140°–220° F. and then 2.5 oz./sq. yd. of the adhesive mass of Example IV is top coated over the barrier coated cloth as the thermoplastic mass.

EXAMPLES VIII-XI

The following examples illustrate the use of vinyl compositions of the present invention both as the backing (Example II, recipe D, Example II, recipe C, Example I, recipe A and Example II, recipe B) and the adhesive (Example IV) in the formation of adhesive tapes.

EXAMPLE VIII 4.0 oz./sq. yd. of the recipe D of Example II is coated on one side of silicone release paper.

2.0 oz./sq. yd. of the thermoplastic mass of Example IV is coated on the above film carried on the silicone release paper.

EXAMPLE IX 3.5 oz./sq. yd. of the recipe C of Example II is coated on one side of silicone release paper.

2.0 oz./sq. yd. of the thermoplastic mass of Example IV is coated on the above film carried on the silicone release paper.

EXAMPLE X 3.0 oz./sq. yd. of the recipe A of Example II is coated on the one side of silicone release paper.

2.0 oz./sq. yd. of the thermoplastic mass of Example IV is coated on the above film carried on the silicone release paper.

EXAMPLE XI 3.0 oz./sq. yd. of recipe E of Example III is calendered on silicone release paper in a manner set forth in Example III.

2.0 oz./sq. yd. of the thermoplastic mass of Example IV is coated on the above film carried on the silicone release paper.

The tapes of Examples VIII–XI are applied to the desired surface by applying a hot iron having a temperature in the range of 300° F. to 400° F. to the back side of the release paper. The release paper is then stripped on cooling.

Reference is now made to the accompanying drawing.

Fig. 1 is a vertical cross section of a tape formed in accordance with the present invention comprising a flexible cloth backing 1 having coated on one side a coat 2 of a chlorinated hydrocarbon solvent resistant vinyl adhesive of the present invention. Fig. 2 illustrates another embodiment of the invention wherein the backing 10 is a chlorinated hydrocarbon solvent resistant vinyl film formed in accordance with the invention having on at least one major surface a coating of an adhesive. Fig. 3 illustrates another embodiment wherein both the vinyl backing 30 and the vinyl adhesive 40 are resistant to attack by chlorinated hydrocarbon solvents, both being formed in accordance with the invention.

The invention in its broader aspect is not limited to the specific steps, methods, compositions, combinations and improvements described but departures may be made therefrom within the scope of the accompanying claims without departing from the principles of the invention and without sacrificing its chief advantages.

It is claimed:

1. A novel tape comprising a chlorinated hydrocarbon resistant, flexible backing film formed from a composition comprising (1) a vinyl chloride co-polymer containing an iso-cyanate reactive group in an amount from about 10% to about 70% by weight of said composition, (2) a compatible plasticizer containing an iso-cyanate reactive group in an amount from about 35% to about 90% by weight of said composition, (3) and a polyisocyanate in an amount from about 3% to about 15% by weight of said composition to effect a chemical linkage between said vinyl chloride copolymer and said plasticizer, (4) and a coating of a thermoplastic adhesive on at least one major surface of said backing film.

2. A novel tape according to claim 1 wherein the vinyl chloride copolymer contains at least one reactive hydroxy group.

3. A novel tape according to claim 1 wherein the plasticizer contains at least one reactive hydroxy group.

4. A novel tape according to claim 1 wherein both the vinyl chloride copolymer and the plasticizer contain at least one reactive hydroxy group.

References Cited in the file of this patent

UNITED STATES PATENTS

| | | |
|---|---|---|
| 2,606,162 | Coffey | Aug. 5, 1952 |
| 2,647,843 | Bemmels | Aug. 4, 1953 |
| 2,806,836 | Nischk | Sept. 17, 1957 |

FOREIGN PATENTS

| | | |
|---|---|---|
| 70,173 | Norway | Mar. 18, 1946 |
| 203,836 | Australia | Oct. 5, 1956 |
| 768,075 | Great Britain | Feb. 13, 1957 |

OTHER REFERENCES

German Application Ser. No. E 7,655 printed June 14, 1956 (Klass 39B Gruppe 2206), 2 pgs. spec. (Copy in Div. 60, Class 260–77.5A.)

UNITED STATES PATENT OFFICE

CERTIFICATE OF CORRECTION

Patent No. 2,979,423            April 11, 1961

Marvin A. Weinberg

It is hereby certified that error appears in the above numbered patent requiring correction and that the said Letters Patent should read as corrected below.

Column 1, line 67, for "solvent" read -- solvents --; column 2, line 47, for '"Platicizer FO7525053," read -- "Plasticizer FO752053," --; column 4, line 35, for "coated" read -- coater --; column 5, lines 34 and 35, for "hydrocarbon resistant" read -- hydrocarbon - resistant --.

Signed and sealed this 24th day of October 1961.

(SEAL)
Attest:

ERNEST W. SWIDER
Attesting Officer

DAVID L. LADD
Commissioner of Patents

USCOMM-DC